April 4, 1961

J. F. BERTSCH ET AL 2,978,256

DUAL HEIGHT SUSPENSION CONTROL MECHANISM

Filed July 11, 1957

INVENTOR.
Joseph F. Bertsch &
BY Kai H. Hansen

W. S. Pettigrew
ATTORNEY.

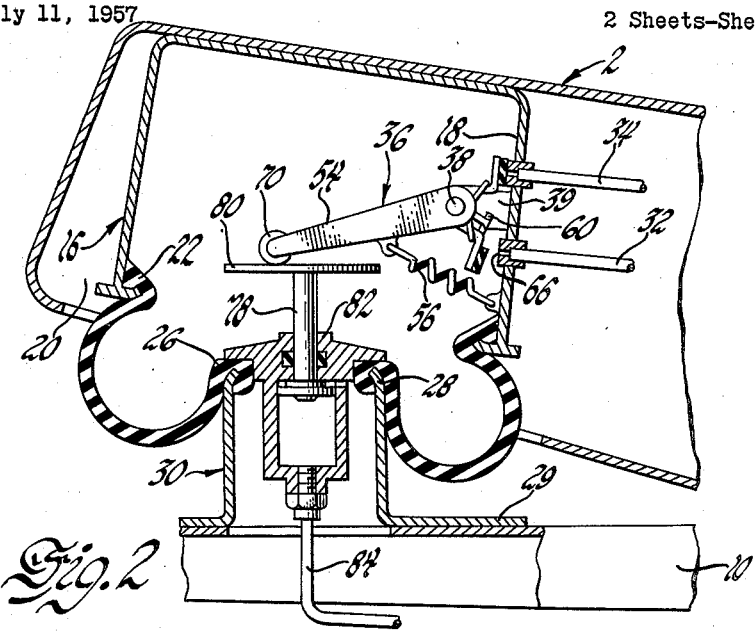
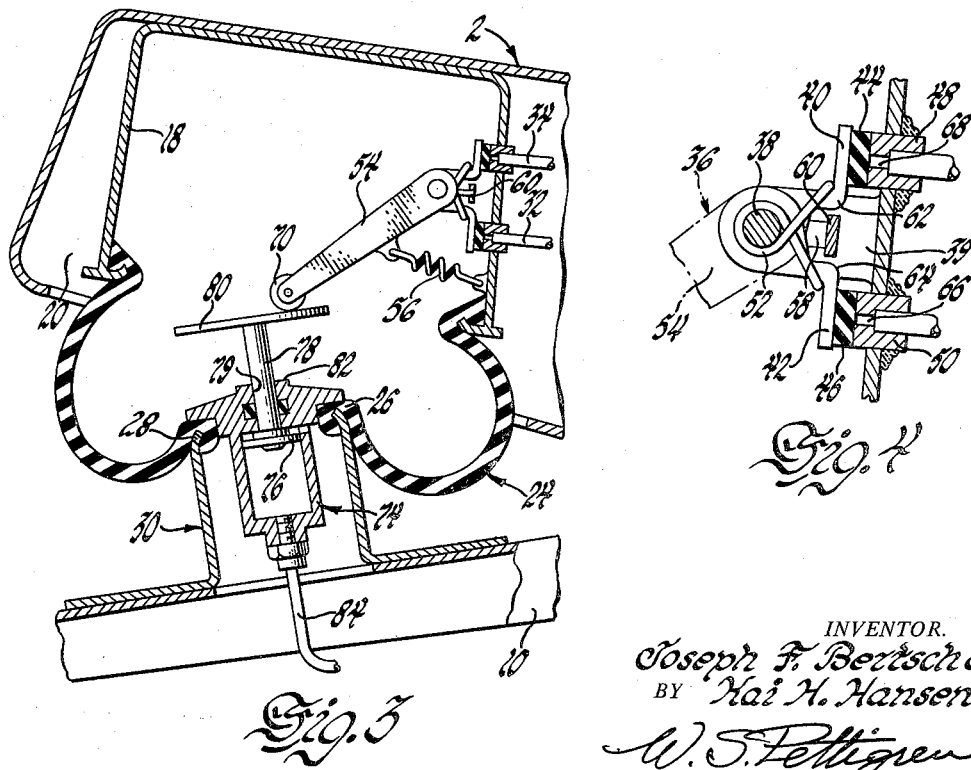

United States Patent Office 2,978,256
Patented Apr. 4, 1961

2,978,256

DUAL HEIGHT SUSPENSION CONTROL MECHANISM

Joseph F. Bertsch and Kai H. Hansen, Detroit, Mich., assignors to General Motors Corporation, Detroit, Mich., a corporation of Delaware Filed July 11, 1957, Ser. No. 671,266

6 Claims. (Cl. 280—124)

This invention relates to pneumatic vehicle suspension and more particularly to control mechanism therefor.

For styling purposes, and to improve handling and stability, modern passenger vehicle design requires very limited clearance between the road and the sprung mass of the vehicle. Under certain circumstances, such road clearance may prove momentarily insufficient and result in grounding of the sprung mass. For example, if a conventionally sprung vehicle encounters an obstacle such as a steep ramp or a high curb, the bumper or frame may become grounded. While this condition usually presents no serious problem in conventionally sprung vehicles, because the restraining force between the ground and the grounded member is only a small portion of the weight of the vehicle, the problem may become very acute in vehicles equipped with pneumatic suspension of the type including leveling valves adapted to vary the air volume in the spring to maintain the sprung mass at a constant design height regardless of variation in load. In the latter case, if the vehicle approaches a ramp or high curb with sufficient momentum, the former will lift the sprung mass, causing the springs to expand a corresponding amount. Expansion of the springs, in turn, causes the leveling valve mechanisms to move to a position effecting exhaust of air from the springs. As a result, the load normally carried by the wheels is shortly entirely imposed on the grounded frame member. Such an occurrence is particularly disastrous where it results in evacuation of the rear springs, since the car will become immobilized due to complete loss of traction of the rear wheels.

An object of the present invention is to provide a pneumatic vehicle suspension having a normal ground clearance and a temporary extended ground clearance.

Another object is to provide control mechanism for a pneumatic vehicle suspension which effects variation from the normal design height road clearance of the vehicle.

A further object is to provide in a vehicle equipped with pneumatic springs, a leveling control mechanism adapted to effect, selectively, a normal design height road clearance for the sprung mass and a second extended ground clearance sufficient to permit negotiation of extraordinary obstacles.

Yet a further object is to provide a device of the stated character which is operable from a remote location.

A still further object is to provide a pneumatic vehicle suspension having a leveling valve structure arranged to respond to variations in displacement between relatively movable portions of an air spring in order to vary the quantity of air in the spring to maintain the sprung mass at a desired road clearance, wherein one of the relatively movable members includes structure which is selectively movable, independent of movement of the member with which it is mounted, to a position causing the leveling valve to establish a second design height for the vehicle providing increased ground clearance.

These and other objects, advantages and features of the invention will become more fully apparent as reference is had to the accompanying specification and drawings wherein:

Fig. 2 is a fragmentary view similar to a portion of Fig. 1 showing the various parts in their initial relationship when the device is operated to establish increased road clearance;

Fig. 3 is a view similar to Fig. 2 showing the relative relationship of the parts when the sprung mass has reached the extended road clearance position; and Fig. 4 is an enlarged fragmentary view, partly in section, showing the general structure of the leveling valve mechanism for admitting and exhausting air into and out of the air spring.

Figure 1:
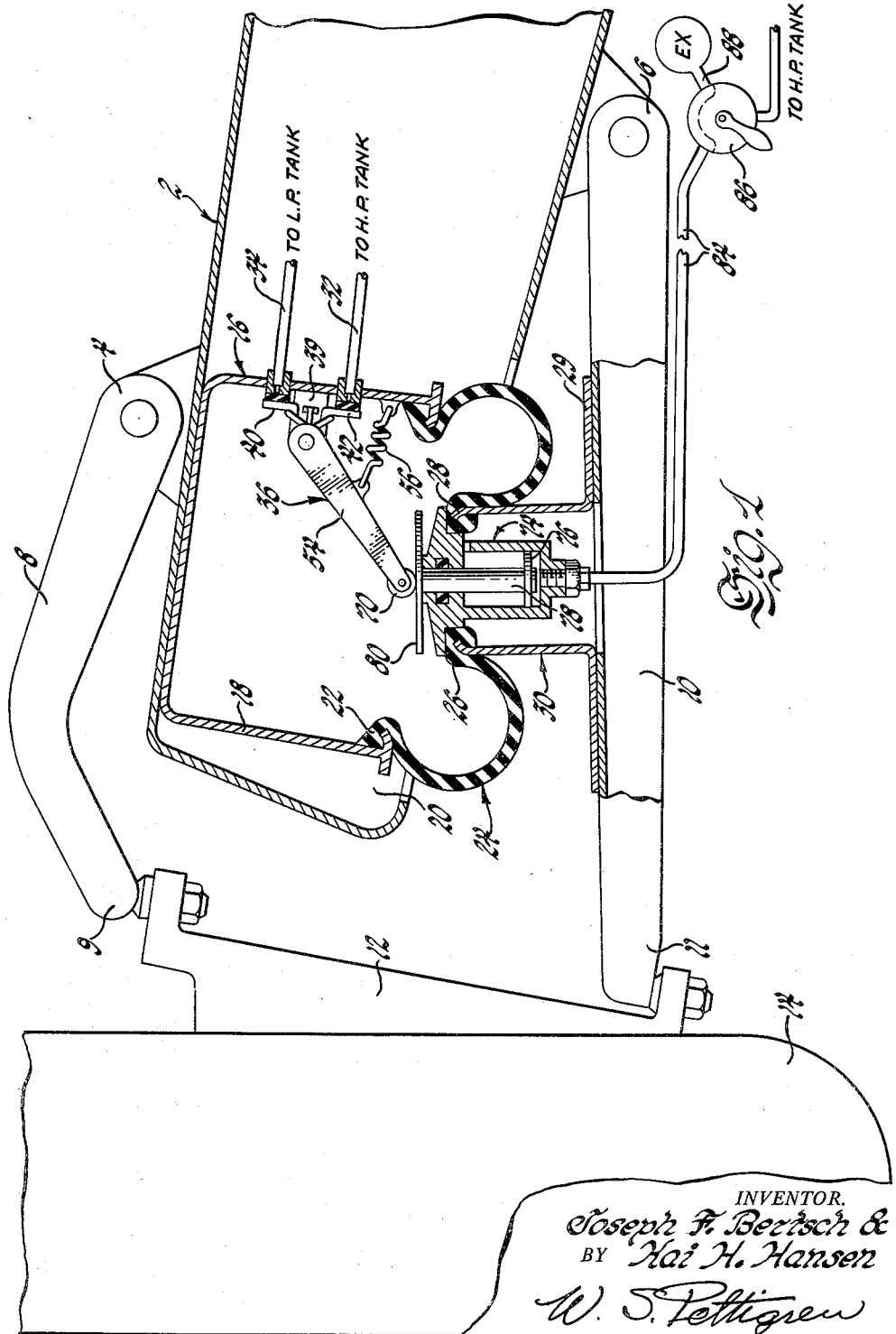
Fig. 1 is a front elevational view, partly in section, of a portion of a vehicle suspension incorporating the present invention, the various parts being shown in the relationship effective to establish normal road clearance.

Referring now to the drawings and particularly Fig. 1, there is illustrated a front wheel suspension assembly in which the reference numeral 2 designates generally the front cross member of the vehicle frame. Pivotally attached at their inboard ends 4 and 6 to the upper and lower sides of cross member 2 are upper and lower transversely extending wishbone arms 8 and 10, respectively. Arms 8 and 10 are pivotally connected at their outer ends 9 and 11, as by ball joints, to a dirigible vertically extending wheel knuckle 12 upon which is rotatably supported the usual vehicle wheel 14.

Frame 2 is resiliently supported relative to the wishbone arms and wheel by means of a pneumatic spring assembly 16. Assembly 16 comprises an inverted generally cup-shaped cylinder 18 which is secured in a recess 20 at the outer end of frame member 2. At its lower open end cylinder 18 is provided with an inturned flange upon which is seated the outer peripheral bead portion 22 of a single convolution flexible bellows 24. The inner bead portion 26 of bellows 24, in turn, engages the inturned lip 28 at the upper end of cylindrical piston 30. The lower flanged end 29 of piston 30, in turn, is secured rigidly to the upper face of lower wishbone arm 10.

To permit introduction and exhaust of air into and out of spring assembly 16, there is provided an air intake conduit 32 and exhaust conduit 34. It will be understood that conduits 32 and 34 communicate with an air supply and exhaust system, not shown. In order to control the flow of air through conduits 32 and 34, there is provided a leveling valve mechanism 36, which in the illustrated embodiment is mounted entirely interiorly of the spring assembly on the side wall of cylinder 18. Assembly 36 is constructed and arranged so that movement of air through either conduit 32 or 34 is prevented as long as the air pressure internally of the spring is sufficient to maintain a predetermined clearance between the frame 2 and the ground. As seen in Fig. 4, assembly 36 comprises a pivot shaft 38 supported by a bracket 39 on the inner wall of member 18 midway between the spaced apart inner ends of conduits 32 and 34. Coaxially journalled on shaft 38 are a pair of flap valves 40 and 42. At their outer ends, valves 40 and 42 have secured thereto elastomeric closure portions 44 and 46 which are adapted for abutting engagement with the inwardly projecting faces of low pressure line fitting 48 and high pressure line fitting 50, respectively. Closures 44 and 46 are biased to the fitting abutting positions shown by means of a double ended coiled torsion spring 52, the central portion of which also surrounds pivot shaft 38. Axially adjacent flap valves 40 and 42, pivot 38 has journalled thereon an inwardly and downwardly extending follower arm 54 which is biased in a counterclockwise direction by a spring 56. At its upper end arm 54 is formed with a tang 58 by having a bent end portion 60 disposed between the opposed shoulders 62 and 64 of flap valves 40 and 42, respectively. It will be evident that clockwise movement of arm 54 from the position shown in Fig. 1 will cause the bent portion 60 to engage the shoulder 64 of flap valve 42 and rotate the latter in a clockwise direction, thereby opening the orifice 66 of intake fitting 50 to allow admission of air into the spring. Similarly, counterclockwise movement of arm 54 from the neutral position shown in Fig. 1 will impart counterclockwise rotation to flap valve 40 and allow exhausting of air through orifice 68 of exhaust fitting 48. It will be noted that slight clearance is provided between portion 60 and each of the shoulders 62 and 64 to allow a certain degree of lost motion of arm 54 so that slight movements thereof do not cause operation of either valve. In order to cause the arm 54 to assume an angular position which is correlated with the desired road clearance, the lower end thereof is provided with a roller 70 which engages a cam plate 80 carried by and movable with the piston 30. Thus, to establish the normal design height of clearance between frame 2 and the ground, it is only necessary to initially orient the angular inclination of arm 54 so that the tang 58 thereof occupies a position midway between the shoulders 62 and 64 of flap valves 40 and 42 when the spring is inflated to a pressure providing the desired height clearance.

In order to facilitate negotiation of unusually irregular terrain or to extricate the vehicle from a grounded condition, means are provided for establishing a second height clearance for the sprung mass. According to the invention, a cylinder assembly 74 extends downwardly through the open upper end of piston 30 and is secured interiorly thereof. A piston 76 carried in cylinder 74 is adapted for vertical displacement therein and has connected thereto a rod 78 which extends through an aperture 79 in the top wall 82 of cylinder 74. Attached to the upper end of rod 78 is a circular plate 80, the top surface of which is engaged by the roller 70 of follower arm 54. Under conditions of normal road clearance, plate 80, rod 78 and piston 76 are urged to the seated position shown in Fig. 1 by spring 56 acting on follower arm 54. As a result, plate 80 normally rests in abutting contact with the top wall 82 of cylinder 74 and defines a follower guide surface whose vertical movement varies according to rise and fall of piston 30. However, when it is desired to temporarily establish extended road clearance, high pressure air is introduced into the bottom side of cylinder 74 through flexible conduit 84 by manipulation of a manual valve 86, preferably located in a position convenient to the vehicle operator. Upon opening of valve 86, piston 76 is urged upwardly in cylinder 74 by high pressure air and causes plate 80 to be displaced a corresponding vertical distance independently of vertical movement of piston 30. As seen in Fig. 2, when plate 80 is so displaced, the resulting vertical movement thereof imparts clockwise movement to follower 54 which, in turn, causes flap valve 42 to move to open position. Consequently, high pressure air is allowed to enter spring 16 from the high pressure tank until the internal pressure of the spring is sufficient to cause expansion, reestablishing the original vertical clearance between plate 80 and the top wall of cylinder 18. As seen best in Fig. 3, when the required clearance has been reestablished, displacement between frame 2 and piston 30 is substantially increased. Since piston 30 is rigidly attached to wishbone arm 10 and the latter is, in turn, connected to wheel 14 resting on the ground, the increased clearance between piston 30 and cylinder 18 causes reaction at pivot 6 resulting in lifting of the frame 2 to a position providing greater than normal ground clearance. After the obstacle or unusual terrain has been negotiated, road clearance is restored to normal by returning valve 86 to its original position allowing exhaust of air from cylinder 74 to atmosphere through conduits 84 and 88. While the invention has been described in connection with the air spring associated with only one wheel of a vehicle, it will be understood that a similar device would be incorporated in each air spring of the vehicle suspension, except in pneumatic suspension employing three point leveling wherein two of the four air springs are controlled by operation of only one leveling valve assembly, in which case only three of the devices are employed.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In an air spring of the type including a piston and cylinder, a lever operated leveling valve assembly, a member associated with said piston adapted for follower engagement with the lever of said assembly to actuate the latter so that movement of the piston above or below a predetermined level relative to said cylinder causes inflation or deflation of said spring, and fluid pressure responsive means operable from a remote location for selectively moving said member to a plurality of positions relative to said piston to permit selective variation of said predetermined level.

2. In a vehicle suspension, an air spring of the type including a flexible body connecting a first rigid member on the sprung mass with a second rigid member on the unsprung mass, a leveling valve assembly adapted to cause movement of air into or out of said spring in accordance with variation in vertical displacement between the sprung and unsprung mass of the vehicle, a piston movable with said second rigid member adapted to actuate said valve assembly, and fluid pressure means for selectively actuating said piston independently of movement of said second rigid member to provide more than one vehicle height clearance.

3. In a vehicle suspension, an air spring of the type including a flexible body connecting a first rigid member on the sprung mass with a second rigid body on the unsprung mass, a leveling valve assembly adapted to cause movement of air into and out of said spring in accordance with variation in vertical displacement between the sprung and unsprung mass of the vehicle, an operating lever for said valve extending into said spring, means mounted coaxially on and movable with said second rigid body adapted to actuate said operating lever, and motor means for selectively moving said last mentioned means independently of movement of said second rigid body to provide more than one vehicle height clearance.

4. In a motor vehicle suspension, an air spring having a first portion mounted on the unsprung mass and a second portion mounted on the sprung mass, valve means for inflating and deflating said spring to maintain said sprung and unsprung portions at a first predetermined displacement, and fluid pressure expansible means mounted on one of said spring portions adapted to alter the operation of said valve means to provide a second predetermined displacement between said sprung and unsprung portions of the vehicle.

5. In a motor vehicle suspension including an airspring having a first rigid portion mounted on the unsprung mass and a second rigid portion mounted on the sprung mass, flexible means connecting said portions, control apparatus operable to inflate and deflate said spring to maintain said sprung and unsprung mass at a first predetermined displacement, said control apparatus including an operating lever yieldably biased in one direction, and fluid pressure responsive axially displaceable means mounted coaxially on one of said spring portions abuttingly engaging the operating lever of said control apparatus, said last mentioned means being movable relative to the spring portion on which it is mounted to alter the operation of said control apparatus to provide a second predetermined displacement between said sprung and unsprung portions of the vehicle.

6. In combination, a source of air under pressure, an air spring including a piston and cylinder connected by a flexible bellows, an abutment plate mounted on said piston in axial alignment therewith and extending into said cylinder, a leveling valve assembly mounted on said cylinder operable to cause movement of said air in and out of said spring in accordance with variation in vertical displacement of said cylinder and said plate, a follower lever valve operating member having a free end yieldably engageable with said abutment plate, a fluid pressure responsive device carried by said piston operative to axially displace said plate relative to said piston, means connecting said pressure responsive device in communication with said source of air, and control means disposed remotely in said last mentioned means for controlling flow of said air to and from said pressure responsive device.

References Cited in the file of this patent

UNITED STATES PATENTS

| | | |
|---|---|---|
| 1,087,305 | Lane | Feb. 17, 1914 |
| 1,664,510 | Hughes | Apr. 3, 1928 |
| 1,787,429 | Floyd | Jan. 6, 1931 |
| 2,361,575 | Thompson | Oct. 31, 1944 |
| 2,443,433 | Sanmori | June 15, 1948 |
| 2,644,699 | Weiertz | July 7, 1953 |
| 2,691,420 | Fox | Oct. 12, 1954 |